3,198,357
TRACTOR-MOUNTED IMPLEMENT CONTROL
Earl E. Shelby, Silver City, Iowa
Filed Sept. 5, 1961, Ser. No. 136,001
1 Claim. (Cl. 214—140)

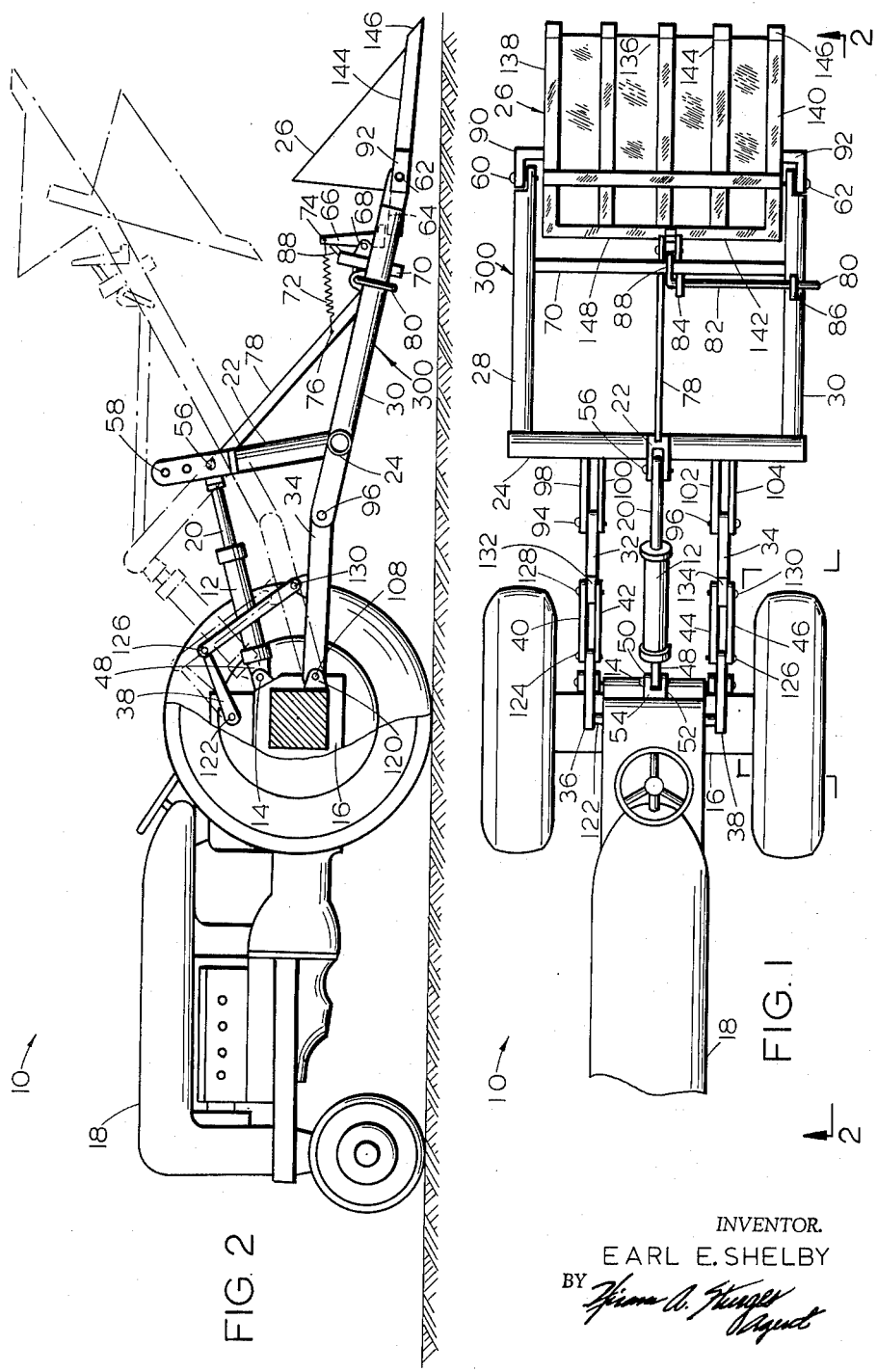

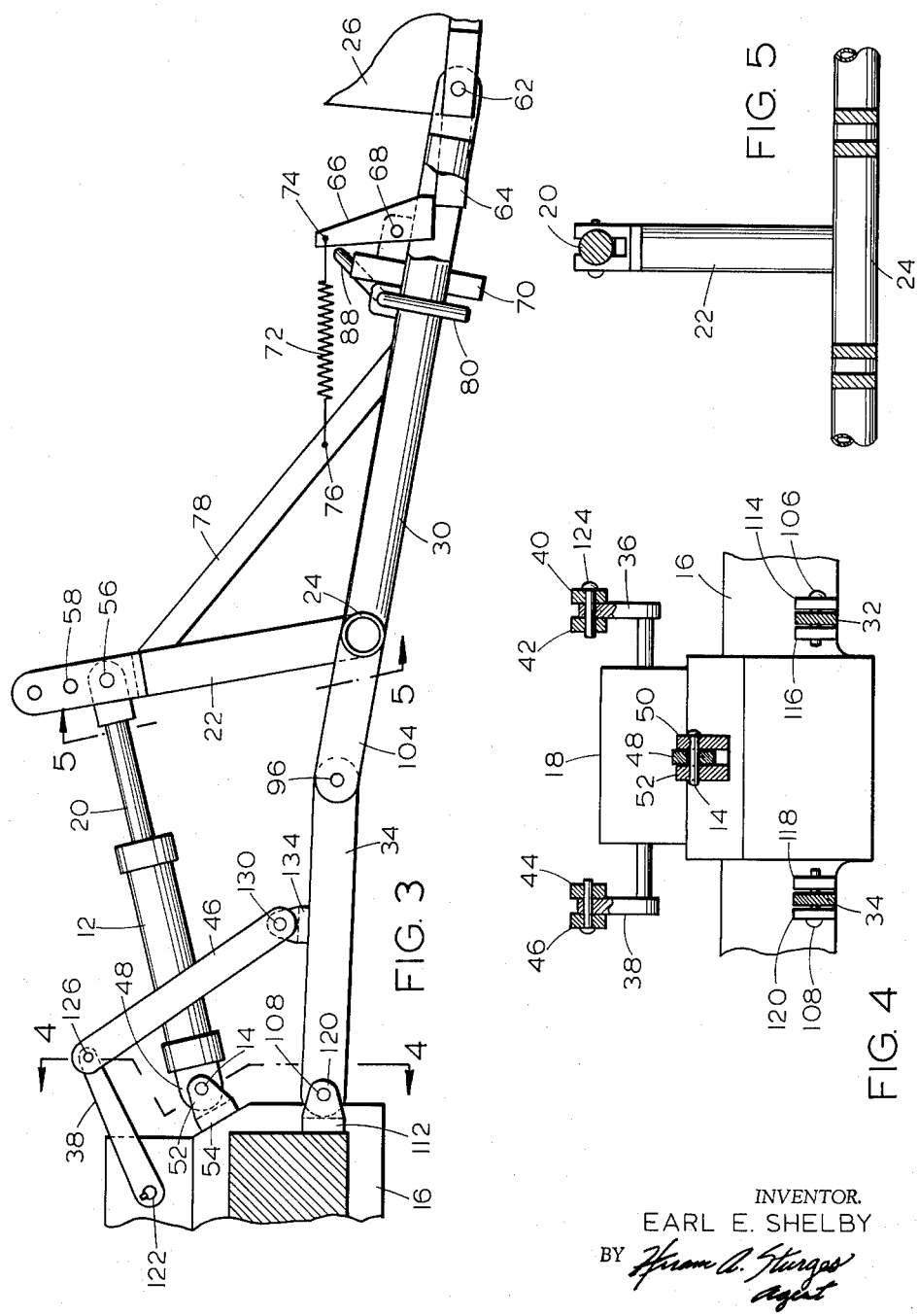

The present invention relates to tractor-mounted loaders such as used particularly for loading manure into manure spreaders, and in particular a loader pivotally mounted on the rear of a tractor and including bucket carrying arms divided into sections, with sections representing upper arms, forearms, and hands of a human being, connected by joints simulating shoulders, elbows, and wrists, and wherein the arms and bucket holding elements thereof are actuated by a hydraulic cylinder supplementing conventional power take-off cylinders of the tractor.

The purpose of this invention is to provide means for supplementing the action of the cylinders of a tractor to facilitate digging when the bucket of the tractor is scooping material for loading a manure spreader or the like.

The vast majority of loaders on the market today have the bucket at the front of the tractor where it is obscured by the tractor housing at the critical time when depth penetration control is vital to the best working speed.

Front end mounted loaders have had the further disadvantage that they have the load mounted nearest the wheels which have the least wheel base and are dangerous because they tend to tip over sideways easily, particularly when the front wheels of a front end loader strike a hole.

Front end mounted loaders have a further disadvantage in that they tend to rare up at the front wheels when the bucket is pushing down. When this happens unexpectedly, the driver may lose his balance and fall.

Rear mounted loaders have been proposed heretofore perhaps because of the many disadvantages of the front mounted loaders. However, rear mounted loaders have had a serious disadvantage and consequently have not been generally accepted. The most common use of a loader, accounting for perhaps more than 90% of the work, is loading manure into the boxes of manure spreaders, which boxes are usually relatively low, or approximately forty-six inches above the ground. To load a manure spreader rapidly requires the lifting of a heavy and full bucket load each time. It has been impossible to do this with a rear-mounted loader of the type having only a pivot action at the lower ends of the bucket arms when the hydraulic cylinders for controlling the pivot action have been only the conventional and hydraulic cylinders used in the standard implement mounted assembly commonly called a 3-point hook-up assembly used on most tractors today. Such conventional cylinders simply do not have the power to raise a really full and heavy bucket of manure.

I have discovered a way of using the relatively weak conventional implement mounting assembly cylinders which are mounted in the rear housing of a conventional tractor. My concept is to do such lifting with these cylinders as they have the power to do, but supplementing these cylinders with a single special cylinder of greater power which I use to control mid-arm pivoting which I refer to as elbow action. This single additional cylinder is much less costly than the two large cylinders needed to control the arms of the conventional front end loader, whereby it is a particular and most important object of my invention to provide an effective loader which can be made available at far lesser cost.

A further object is to provide a loader, the effective cost of which is lessened by the multiple uses to which my mid-arm pivoting control cylinder can be put. There are many other uses on a farm for this cylinder by simply detaching it. Also, it is possible for a manufacturer to sell the loader of my invention without the mid-arm pivoting control cylinder, whereby the farmer can then use the cylinder he already has on the farm for other uses, making possible a lesser total investment for the farmer, who is already burdened with machinery investments.

The reason a conventional front end loader cannot be sold without cylinders in order for farmers to use cylinders they might already have on the farm with it, is because the cylinders for a front end loader must be very long, the cylinder portions alone being over 24 inches long, and such long cylinders are not suitable for many other uses on a farm. In contrast, the mid-arm control cylinder of my invention need have a cylinder portion of only about 8 inches in length, such cylinders having many other uses on a farm whereby a farmer often already has such a cylinder.

During shoveling operations with most loaders the penetration is controllable, but the angle of approach of the bottom of the bucket is not controllable independently of the penetration control. It is, therefore, an object of my invention to provide a loader having my mid-arm or elbow action pivoting control to permit the angle of approach of the bucket to be regulated independently of the pivoting of the inner ends of the arms, which is referred to as shoulder pivoting. This makes it possible for the bucket to enter the work with its bottom at a greater angle for ease of initial penetration, and then making it possible to level off the bucket by means of elbow action pivoting or bending the bucket arms downwardly in the middle for reducing the angle of approach of the bucket to the work so that the penetration thereafter is not excessive, this being a further advantage of my mid-arm or elbow action pivoting.

A further object is to provide a plurality of optional connecting points for the outer end of the mid-arm, or forearm, pivoting or elbow action control cylinder, such connection points being spaced upwardly from each other whereby different selected ones of these connection points can be used when desired to give the same effect as a longer or shorter cylinder stroke would, with an advantage in the use of an upper connection point in that the bucket can be lower with respect to the inner portions of the bucket control arms than could otherwise be obtained with the relatively short and inexpensive cylinder I use for further attaining an economy in the use of a relatively short cylinder as compared with a longer and, therefore, more expensive cylinder.

Many other implements of the type mounted on implement mounted assemblies, of the type referred to as 3-point hook-up assemblies, can be used on mounting arms which have the mid-pivoting or elbow action pivoting of this invention and, therefore, it is an object to provide as an article of manufacture, a mounting arm assembly having such mid-point pivoting as well as inner end or shoulder pivoting for use on many other types of implements.

A still further object is to provide a loader assembly which have the mid-pivoting or elbow action pivot- and quickly, and which can be removed from the tractor elements simply and quickly, leaving no loader element parts attached to the tractor. Heretofore, the great length of time required to attach a front end loader assembly to a tractor has caused the operators to leave the loader attachment brackets on the tractor even during the use of the tractor for other operations. This has resulted in considerable disadvantage as such parts are often in the way.

A further object of the invention is to provide a rear end loader which is marketable, and in which other advantages, such as better visibility of the inclination of the bucket during the critical shoveling, better traction because the loader is near the rear drive wheels, and increased stability for other reasons are available; said other reasons for increased stability of rear mounted loaders being because the bucket is closest to that end of the tractor which has the broadest wheel base, namely, the rear end.

It is, therefore, an object of the invention to provide my new concept which once again places the balance of advantages in favor of a rear end loader, my new concept being the use of a pivoting action between the ends of the bucket supporting arms, which pivoting action I prefer to call an elbow action to distinguish it from the pivoting of the arms at their tractor ends, which is referred to as a shoulder pivoting action, and the new concept also including still another pivot action which is a bucket dumping pivot action, being in the analogy, similar to a human wrist action.

A further object is to provide a hydraulic cylinder assembly for regulating the selective pivoting positions of the outer ends of the bucket arms of a rear end loader with respect to the inner ends.

A further object is to provide a loader for mounting on the rear end of a tractor in which a large part of the scoop lifting is done by a single cylinder operating the outer ends of both of the bucket carrying arms simultaneously so that both are raised and lowered at the same time equally and in balance so that a disadvantage of earlier loaders is avoided wherein the cylinder of one side acts quicker than the cylinder on the other side.

A particular object is to provide a loader assembly which can be quickly attached to and quickly disconnected from the rear of a tractor in about fifteen minutes or less.

Heretofore, it has been impractical to use standard tractor mounted implement control 3-point hook-up lift arms to raise the rear end loader arms because the amount of movement of such rear end 3-point hook-up arms is so limited. It is therefore, an object of this invention to provide a simple way of utilizing a single extra cylinder to gain the remainder of the pivoting movement sometimes required for a high lift.

A particular object is to provide as an article of manufacture a tractor-mounted implement system for manipulating loaders or other implements as described in which the elbow action is controlled by a hydraulic cylinder which acts like the biceps muscle of a human being and which is quickly and delicately and handily controllable by an operator with controls at the driver's seat of the tractor without the necessity for the operator to get down from his tractor to make any adjustments, to the end that a degree of immediate control is attained that has heretofore been impossible.

A still further object of the invention is to provide a tractor-mounted loader for use on the rear of a tractor in which the loader is of simple and economical construction.

Other and further objects and advantages of the present invention will be apparent from the following detailed description, drawings and claim, the scope of the invention not being limited to the drawings themselves as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a plan view of the improved tractor-mounted loader showing the loader extended from the rear of the tractor.

FIGURE 2 is a longitudinal section through the tractor-mounted loader, taken on line 2—2 of FIGURE 1, showing the loader in the bucket loading position in full lines, and showing the parts in a bucket dumping position in broken lines.

FIGURE 3 is a longitudinal section similar to that shown in FIGURE 2, with the parts shown on an enlarged scale, and with parts broken away and parts omitted.

FIGURE 4 is a cross section through the inner or mounting end of the loader, taken on line 4—4 of FIGURE 3, and showing, in particular, the pivotal connections of the elements.

FIGURE 5 is a cross section through the loader taken on line 5—5 of FIGURE 3.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit of the invention, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a cylinder pivotally mounted by a pin 14 on a rear axle housing 16 of a tractor 18 and connected by a piston rod 20 to an upstanding support means or arm 22 extended upwardly from a cross beam 24, numeral 26 a bucket carried by forearm sections 28 and 30 of the bucket carrying arms, the sections 28 and 30 extending from ends of the cross beam 24, numerals 32 and 34 indicating sections representing upper arm portions of the bucket carrying arms, numerals 36 and 38 indicating power take-off arms or tractor mounted controllable lifting levers or 3-point hook-up lifting levers of the tractor, and numerals 40 and 42 indicating links connecting the power take-off arm 36 to the section 32, and the numerals 44 and 46 links connecting the arm 38 to the upper arm section 34.

The cylinder 12 is provided with a tang 48 that is pivotally mounted by the pin 14 between ears 50 and 52 of a bearing 54, and the outer end of the piston rod 20 is pivotally connected by a pin 56 to the upper end of the arm 22 through spaced openings 58. By this means movement of the bucket 26 is regulated by changing the pin 56 from one of the openings 58 to another.

The bucket is pivotally mounted in the forearms 28 and 30 by pins 60 and 62, and the heel of the bucket is provided with a finger 64 that is positioned to engage a latch 66 pivotally mounted by a pin 68 on a bar 70 and resiliently retained in the position of locking the bucket in the digging position by a spring 72. One end of the spring is secured in an opening 74 in the upper end of the latch, and the opposite end is held in an opening 76 in a bar 78 extended from the arm 22 to the bar 70. The latch is actuated to release the bucket by a hand lever 80 on the outer end of a rod 82 rotatably mounted in bearings 84 and 86 and having an arm 88 on the inner end and positioned to engage the latch 66. By this means the bucket may be dumped as desired.

The pins 60 and 62, connecting the frame members 90 and 92 of the bucket 26 to the ends of the forearm sections 28 and 30 provide a wrist movement, and the forearm assembly is connected to the upper arms 32 and 34 with an elbow action provided by the pins 94 and 96 extended through the upper arms 32 and 34 and also through tangs 98 and 100 positioned on the sides of the upper arm 32, and the tangs 102 and 104 on the sides of the upper arm 34.

The double-jointed bucket carrying arms are pivotally mounted on the rear axle housing 16 by pins 106 and 108 which extend through the upper arms 32 and 34 and ears of bearings 110 and 112, the bearing 110 being provided with ears 114 and 116, and the bearing 112 with similar ears 118 and 120. This mounting of the upper ends of the upper arms provides an action similar to that of the shoulder of a human being.

The complete shoulder action of the upper arms is accomplished by the power take-off arms 36 and 38 of the tractor through the links 40, 42, 44 and 46. The arms 36 and 38 are mounted on the ends of a shaft 122 of the tractor, and the outer end of the arm 36 is connected by a pin 124 to the links 40 and 42. The outer end of the arm 38 is connected by a pin 126 to the links 44 and 46. The lower ends of the links 40 and 42 are connected by a pin 128 to the upper arm 32, and the lower ends of the links 44 and 46 are connected by a pin 130 to the upper arm 34. The pin 128 is held in ears of a bearing 132 on the upper arm 32, and the pin 130 is positioned in ears of a bearing 134 on the upper arm 34.

The bucket 26 is provided with a bottom 136, end walls 138 and 140, and a rear wall 142, and the bottom is reinforced by spaced bars 144 having beveled extended ends 146. The latch finger 64 extends from a transverse bar 148 and is held with the bucket in a digging position, as shown in FIGURE 2, by the latch 66 on the cross bar 70.

OPERATION

As described, a certain amount of lifting control of any implement such as the bucket 26 is provided by the manipulation of the tractor-mounted 3-point hook-up lifting levers 36 and 38.

However, an additional, and for some uses, extremely vital new extra way of attaining lifting is provided by the cylinder 12 which operates like the biceps muscle on the human arm to control a pivoting about the pins 94 and 96 which latter define a horizontal pivot axis similar to the human elbow.

This vital lifting is greatly needed in many uses and the absence of the possibility of having this extra lifting is believed to be the reason that 3-point hook-up controlled loaders have not been more popular.

The operation of both the biceps-like cylinder 12 and the lifting levers 38 from the driver's seat of the tractor is made possible by the attachment of the cylinder 12 to controllable power means not shown which latter would be mounted on the tractor where the operator can control the same from his driver's seat.

It is significant that control of both levers 38 and cylinders 12 are possible without the necessity for the driver to get down from his tractor. Such controllings are immediate. It is very important that, as shown in the drawings, my two-way cylinder 12 is independent and free of any cylinder-operating connection with said tractor-mounted controllable lifting levers 36 and 38 and also of any means for control of the latter. It will be seen that an implement-carrying frame 300 is defined by tangs 98 and 100 and by other frame elements disposed rearwardly thereof such as cross beam 24 and forearm sections 28 and 30.

It will be seen that the implement-carrying frame 300 or frame means, as it can also be called, can define only pivotal movements with respect to the arms 32 and 34 and cannot define other kinds of movement with respect thereto.

The loader may be attached to or removed from a tractor by the average layman, and in a comparatively few minutes.

It will be seen that this application has provided a tractor-mounted implement control of versatile use with many kinds of implements, the control of this invention being identified, for example, in FIGURES 1 and 2 of the drawings as being all parts shown with the exception of the tractor, the scoop and its connections to the arms 28 and 30, the conventional three-point hook-up lifting levers 36 and 38, the lift arms 32 and 34, and conventional means powering the three-point hook-up lifting levers 36 and 38.

From the foregoing description, it is thought to be obvious that a tractor-mounted loader constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention that which is claimed to be new and desired to be procured by Letters Patent, is:

A device adapted to be mounted on a tractor of a kind having a pair of tractor-mounted controllable lifting levers extending rearwardly from the rearward end thereof, said lifting levers being swingable upwardly and downwardly at their rearward ends about a horizontal axis at their forward ends, said horizontal axis being disposed in fixed position with respect to said tractor whereby said horizontal axis does not move upwardly or downwardly with respect to said tractor, and power means attached to said tractor and controllable by the operator thereof for controlling upward and downward movements of the rearward ends of said lifting levers, said device comprising: a pair of rearwardly extending support arms disposable at the rearward end of a tractor, means for pivotally mounting the forward ends of said arms on the rear axle housing of said tractor, means for connecting said arms to said tractor-mounted controllable lifting levers in positions for the use of said levers to raise and lower said arms pivotally about their forward ends, an implement carrying frame means pivotally attached to the rearward ends of said arms whereby said frame means can define only pivotal means with respect to said arms and whereby said frame means is adapted to be swingably raised and lowered at its rearward end with respect to the rearward ends of said arms about a horizontal axis extending transversely of said arms and of said tractor, and a two-way hydraulic cylinder assembly extending rearwardly from said tractor, means for pivotally mounting the forward end of said hydraulic cylinder assembly on said tractor above said support arms for upward and downward movements of the rear end of said hydraulic cylinder assembly, upstanding support means attached to and extending upwardly from said implement frame, means for pivotally connecting the rearward end of said two-way cylinder to said upstanding support means at a position spaced a substantial distance upwardly from the pivotal connection between said arms and said frame, whereby vertical swinging movements of said rearward ends of said arms are controllable by the operator through said tractor-mounted levers and whereby vertical swinging movements of the rearward end of said implement frame about its pivotal connection to said arms can be controlled by the tractor operator by operation of said two-way hydraulic cylinder assembly, and whereby said cylinder assembly can be attached to a controllable power means mounted on the tractor and controllable by the operator from his driver's seat for supplying reversible hydraulic pressure to said hydraulic cylinder, and means on the rearward end of said implement-carrying frame for facilitating the connection of said frame to an implement, whereby the vertical positioning and the inclination with respect to the vertical of said implement by said cylinder can be substantially immediately controlled, said two-way hydraulic cylinder being independent and free of any cylinder-operating connection with said tractor-mounted controllable lifting levers and also of any means for control of the latter.

References Cited by the Examiner

UNITED STATES PATENTS

| | | | |
|---|---|---|---|
| 1,371,344 | 3/21 | Brackett | 214—131 |
| 2,449,212 | 9/48 | Fraga | 214—140 |
| 2,455,727 | 12/48 | Bunting | 172—444 X |
| 2,496,874 | 2/50 | Holopainen | 214—140 |
| 2,718,318 | 9/55 | Schmucker et al. | 214—140 |
| 2,827,183 | 3/58 | Wagner et al. | 214—132 |
| 2,832,276 | 4/55 | Hietshu | 172—444 XR |
| 2,868,399 | 1/59 | Fortier | 214—131 |
| 2,887,166 | 5/59 | Vogelaar | 172—444 X |

FOREIGN PATENTS 624,460  6/49  Great Britain.

HUGO O. SCHULZ, *Primary Examiner.*
GERALD M. FORLENZA, *Examiner.*